(12) United States Patent
Bleyer et al.

(10) Patent No.: US 11,516,385 B2
(45) Date of Patent: Nov. 29, 2022

(54) DYNAMIC QUALITY PROXY PLURAL CAMERA IMAGE BLENDING

(71) Applicant: Microsoft Technology Licensing, LLC, Redmond, WA (US)

(72) Inventors: Michael Bleyer, Seattle, WA (US); Raymond Kirk Price, Redmond, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/116,829

(22) Filed: Dec. 9, 2020

(65) Prior Publication Data

US 2022/0182534 A1    Jun. 9, 2022

(51) Int. Cl.
*H04N 5/232* (2006.01)
*H04N 5/247* (2006.01)
*H04N 5/265* (2006.01)

(52) U.S. Cl.
CPC ......... *H04N 5/23222* (2013.01); *H04N 5/247* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 8,587,659 B1 | 11/2013 | Socolinsky et al. | |
| 2007/0235634 A1 | 10/2007 | Ottney et al. | |
| 2013/0057698 A1* | 3/2013 | Hayes | G06K 9/6289 |
| | | | 348/E5.09 |
| 2014/0193090 A1* | 7/2014 | Kusuda | G06T 5/002 |
| | | | 382/254 |
| 2015/0043775 A1* | 2/2015 | Fujii | G06T 5/009 |
| | | | 382/103 |
| 2019/0037196 A1* | 1/2019 | Kim | G02B 27/01 |
| 2019/0208181 A1* | 7/2019 | Rowell | H04N 5/23238 |
| 2020/0077033 A1* | 3/2020 | Chan | H04N 5/2353 |

OTHER PUBLICATIONS

Kleinschmidt, et al., "Probabilistic Fusion and Analysis of Multimodal Image Features", In Proceedings of 18th International Conference on Advanced Robotics (ICAR), Jul. 10, 2017, pp. 498-504.
"International Search Report and Written Opinion issued in PCT Application No. PCT/US21/053871", dated Jan. 25, 2022, 14 Pages.

* cited by examiner

*Primary Examiner* — Eileen M Adams
(74) *Attorney, Agent, or Firm* — Alleman Hall Creasman & Tuttle LLP (57) ABSTRACT

Examples are disclosed that relate to blending different types of images captured by different types of cameras employing different sensing modalities based on a dynamic weighting. The dynamic weighting is calculated based on a dynamic quality proxy that serves as an approximation of image quality that may change from image to image. In one example, a first image of a scene is received from a first camera. A dynamic quality proxy is received. A second image of the scene is received from a second camera with a different sensing modality than the first camera. A composite image blended from the first and second images in proportion to a dynamic weighting that is based on the dynamic quality proxy is output.

20 Claims, 6 Drawing Sheets

DYNAMIC QUALITY PROXY PLURAL CAMERA IMAGE BLENDING

BACKGROUND

Under different environmental conditions, different types of images captured by different types of cameras employing different sensing modalities may vary in quality. Depending on the particular environmental conditions, a particular type of image may allow the user to visually identify one or more objects of interest in the scene and distinguish such object(s) of interest from other objects in the scene more easily than viewing another type of image. For example, during low ambient light conditions, such as at dawn or dusk or at night, a low-light image of a scene captured by a low-light camera may allow a user to identify an object in the scene more easily than a typical color image captured by a color camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to blending different types of images captured by different types of cameras employing different sensing modalities based on a dynamic weighting. The dynamic weighting is calculated based on a dynamic quality proxy that serves as an approximation of image quality that may change from image to image. In one example, a first image of a scene is received from a first camera. A dynamic quality proxy is received. A second image of the scene is received from a second camera with a different sensing modality than the first camera. A composite image blended from the first and second images in proportion to a dynamic weighting that is based on the dynamic quality proxy is output.

DETAILED DESCRIPTION

Under different environmental conditions, different types of images of a scene captured by different types of cameras employing different sensing modalities may provide different levels of visual assistance to a user viewing the scene. In some cases, two or more different types of images of a scene may be blended together to form a composite image that provides visual enhancement compared to either of the component images alone. For example, a low-light image may be blended with a thermal image to form a composite image that helps a user see better than the low-light image alone or the thermal-image alone.

However, some environmental conditions may cause one type of camera to capture an image having a lower signal-to-noise ratio or "lower image quality" than another type of image captured by a different type of camera. As one example, a low-light camera may capture a "lower quality" low-light image when the scene is completely dark (e.g., at night with no moon or starlight). As another example, a thermal camera may capture a "lower quality" thermal image when the scene has a relatively small temperature range (e.g., indoors where the temperature is regulated and/or stabilized). Blending a "lower quality" image with a "higher quality" image using equal weighting would result in an overall "lower quality" composite image that limits the degree to which the composite image visually enhances the scene.

Accordingly, the present description is directed to an approach for forming a composite image by blending different types of images captured by different types of cameras employing different sensing modalities in proportion to a dynamic weighting. The dynamic weighting is calculated based on a dynamic quality proxy that serves as an approximation of image quality. The quality proxy is referred to as being dynamic because the quality proxy may change on an image-to-image basis. The dynamic quality proxy may be determined from metadata associated with an image. By dynamically adjusting the weighting used to blend the images based on the approximation of image quality, a contribution of a "higher quality" image may be greater than a contribution of a "lower quality" image, such that the resulting composite image may have an overall "higher quality". Further, the blended composite image may be better than any of the composite images alone.

Figure 1:
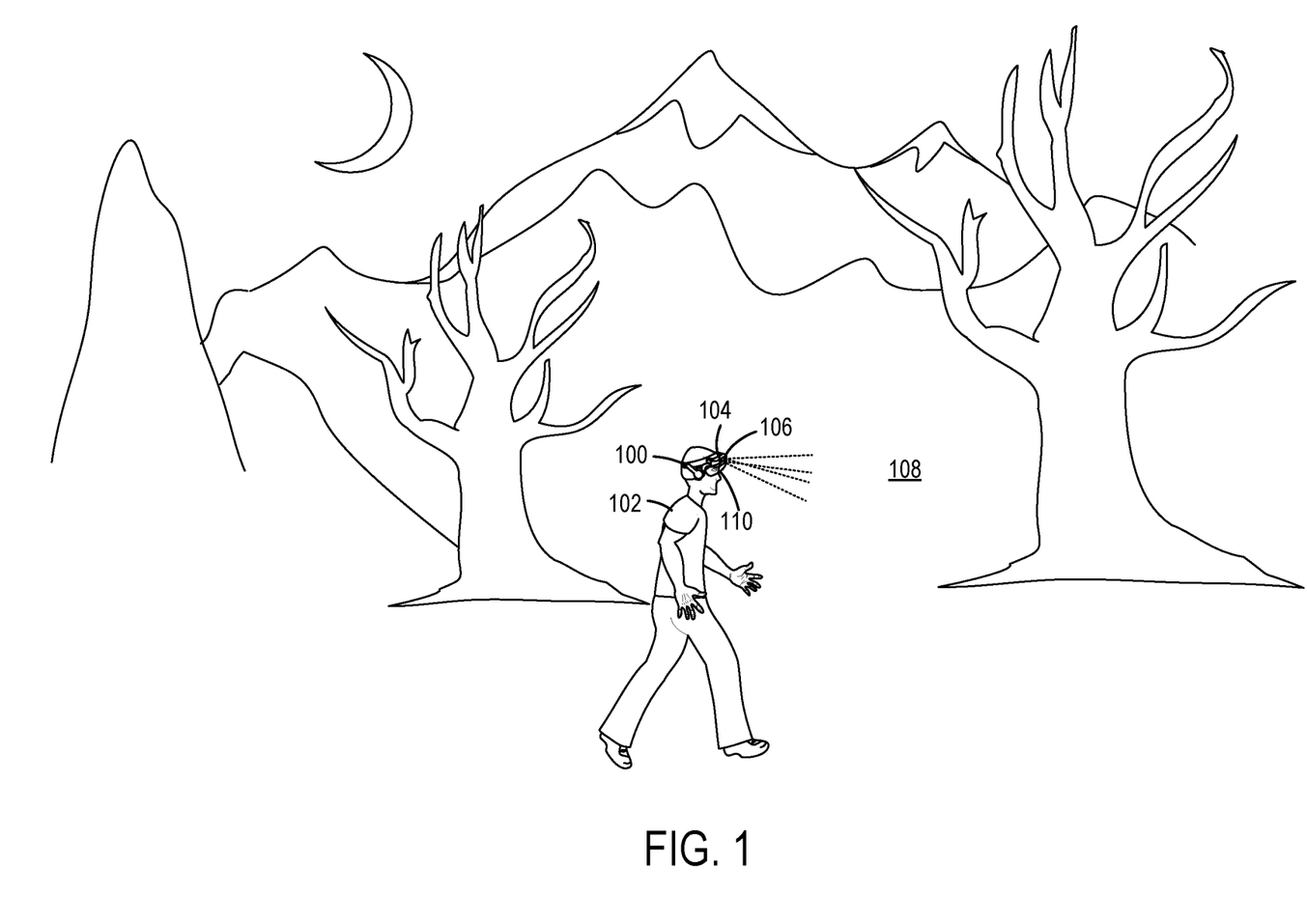
FIG. 1 shows an example visual assistance device worn by a user.

FIG. 1 shows aspects of an example visual assistance device 100 worn by a user 102. The visual assistance device 100 includes an outward-facing low-light camera 104 and an outward-facing thermal camera 106, each configured to image a real-world physical scene 108. The visual assistance device 100 further includes a near-eye display 110. The visual assistance device 100 is configured to perform image signal processing on low-light images captured by the low-light camera 104 and thermal images captured by the thermal camera 106 to form composite images that are visually presented to the user 102 via the near-eye display 110. In particular, the visual assistance device 100 is configured to form a composite image by blending a low-light image and a thermal image in proportion to a dynamic weighting. The dynamic weighting is calculated based on a dynamic quality proxy that serves as an approximation of "image quality" that may change from image to image. The dynamic quality proxy may be determined from metadata associated with an image. In the illustrated example, the dynamic quality proxy includes an analog gain setting of a low-light sensor of the low-light camera 104 when the low-light camera 104 captures the low-light image that is being blended.

Accordingly, in the illustrated example, as the real-world physical scene 108 becomes darker throughout the night, the analog gain of the low-light sensor of the low-light camera 104 may automatically increase to compensate for the decrease in ambient light. The increase in analog gain of the low-light sensor of the low-light camera 104 causes the dynamic weighting to increase a contribution of a thermal image and decrease a contribution of the low-light image in proportion to the increase of the analog gain. As such, the resulting composite image may be less influenced by the "lower quality" low-light image and more influenced by the thermal image relative to a composite image formed during brighter ambient lighting conditions. Likewise, as the real-world physical scene 108 becomes brighter (e.g., near dawn), the analog gain of the low-light sensor of the low-light camera 104 may automatically decrease to compensate for the increase in ambient light. The decrease in analog gain of the low-light camera 104 causes the dynamic weighting to decrease a contribution of a thermal image and increase a contribution of the low-light image in proportion to the decrease of the analog gain. As such, the resulting composite image may be more influenced by the low-light image and less influenced by the thermal image relative to the composite image formed during darker ambient lighting conditions. In some implementations, the dynamic quality proxy includes a camera parameter or setting that is already available. As such, the images themselves do not have to be analyzed to assess weighting. Instead, an easy calculation can be performed based on the already-available parameters, thus decreasing the computational expense of dynamically blending the images.

The visual assistance device 100 is provided as a non-limiting example and other visual assistance configurations may be used without departing from the scope of the present disclosure. For example, in some implementations, the visual assistance device may include one or more additional different types of cameras employing additional different sensing modalities and configured to capture different types of images that may be used to form a composite image using the image blending techniques describe herein. In some implementations, the visual assistance device 100 may not include a display, and instead may output blended images to displays and/or other receiving devices.

Figure 2:
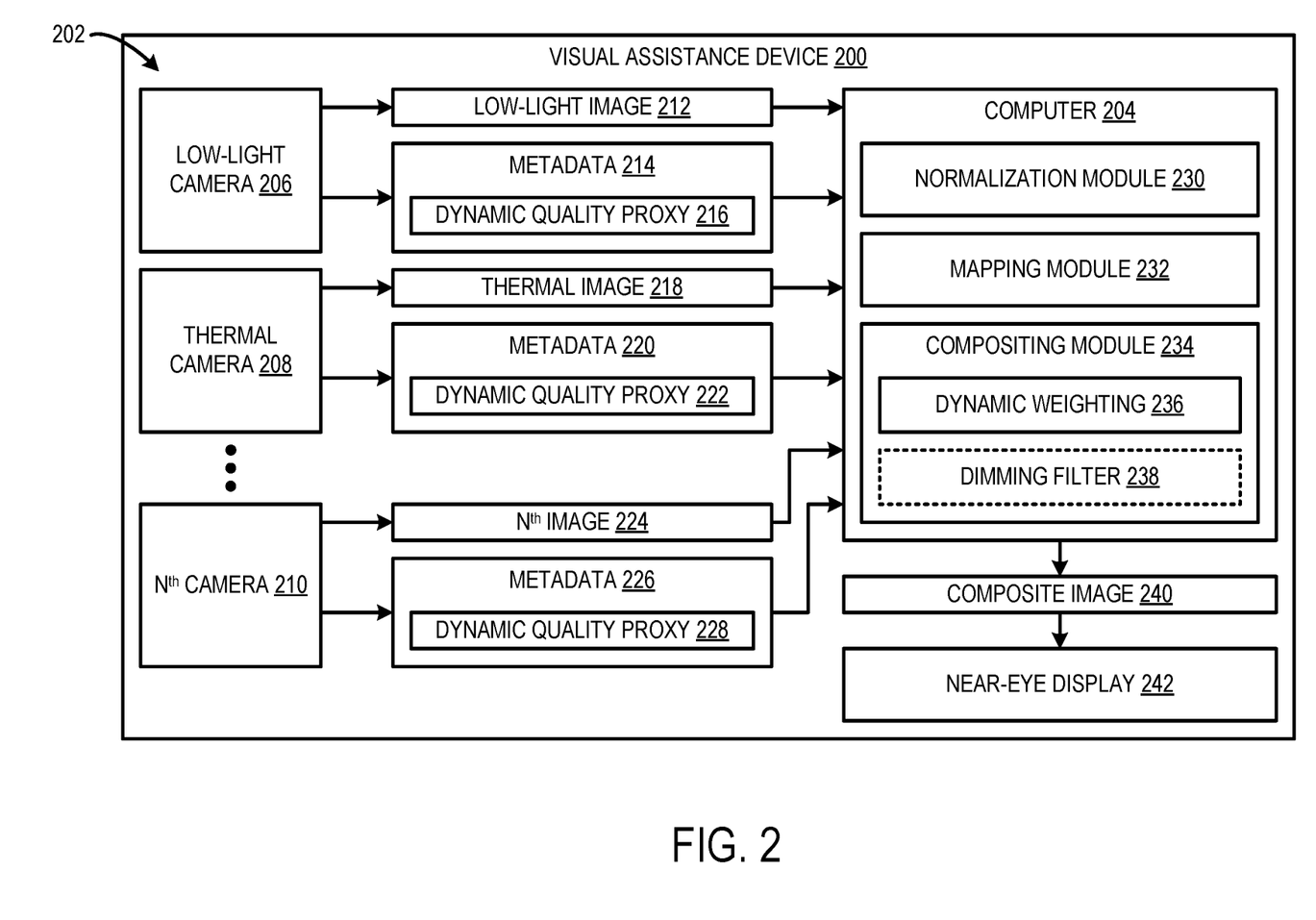
FIG. 2 shows a computer architecture diagram of an example visual assistance device.

FIG. 2 shows an example visual assistance device 200. For example, the visual assistance device 200 may correspond to the visual assistance device 100 described above and illustrated in FIG. 1, or any other suitable computing system configured to perform the image blending techniques described herein. As one example, the visual assistance device 200 may be a head-mounted device worn by a user. The visual assistance device 200 includes a plurality of cameras 202 communicatively coupled to a computer 204. The plurality of cameras 202 and the computer 204 may communicate via any suitable wired or wireless communication protocols. The visual assistance device 200 may include two or more different types of cameras that capture images that may be blended together to form composite images that are visually presented on a near-eye display 242. In this example, the plurality of cameras 202 includes a low-light camera 206 and a thermal camera 208. The visual assistance device 200 optionally may include one or more additional cameras including an $N^{th}$ camera 210. Such optional additional cameras may include, but are not limited to, monochrome, color (e.g., RBG), infrared (IR), depth, ultraviolet (UV), X-ray, or another type of camera, or any other type of sensor (e.g., single-photon avalanche diode (SPAD), LIDAR, sonar). The visual assistance device 100 may include any suitable type of camera employing any suitable type of sensing modality.

The low-light camera 206 is configured to measure low levels of light from various wavelengths and digitize the measured light into a low-light image 212 including a plurality of pixels. The low-light image 212 may be saved as any suitable data structure. As one example, the low-light image 212 may be saved as a matrix of values, where each value corresponds to pixels of a sensor array of the low-light camera 206. Each value of the matrix represents light intensity captured by the corresponding pixel of the sensor array at a given bit depth. For example, an 8-bit pixel value may be used to represent 256 different light intensity levels for that pixel. Any suitable bit depth may be used. In some examples, the low-light image 212 is a monochrome image having one color channel representing light intensity. In other examples, the low-light image 212 is a color image having a plurality of color channels representing light intensity. The low-light camera 206 is configured to send the low-light image 212 and associated metadata 214 to the computer 204 for image signal processing. The metadata 214 may include characteristics of the low-light image 212 (e.g., dimensions, resolution, bit depth, histograms, timestamp, geolocation) and/or camera settings (e.g., analog gain, exposure, aperture, focal length) of the low-light camera 206 when the low-light camera 206 captures the low-light image 212. A dynamic quality proxy 216 that serves as an approximation of image quality of the low-light image 212 may be determined from the metadata 214. In one example, the dynamic quality proxy 216 for the low-light image 212 may include an analog gain setting of a low-light sensor of the low-light camera 206 for the low-light image 212. In another example where the low-light camera 206 has an adjustable aperture, the dynamic quality proxy 216 may include an aperture setting of the low-light camera 206 for the low-light image 212. In yet another example, the dynamic quality proxy 216 may include an exposure setting of the low-light camera 206 for the low-light image 212. In some examples, multiple of these or other camera settings may be combined to determine the dynamic quality proxy 216.

The thermal camera 208 is configured to capture a thermal image 218 characterized as a matrix of values corresponding to pixels of a thermal sensor array of the thermal camera 208. In some nonlimiting implementations, the thermal sensor array may be configured to detect infrared light (e.g., in a wavelength range of ~8,000 nm (8 μm) to about 14,000 nm (14 μm)) and translate the detected infrared light into a temperature. Each value of the matrix represents a temperature of on object in a real-world physical scene captured by the corresponding pixel of the thermal sensor array at a given bit depth. The thermal camera 208 is configured to send the thermal image 218 and associated metadata 220 to the computer 204 for image signal processing. A dynamic quality proxy 222 that serves as an approximation of image quality of the thermal image 218 may be determined from the metadata 218. In one example, the dynamic quality proxy 222 for the thermal image 218 is a temperature range of the thermal image 218. For example, such a temperature range may be determined based a temperature characterization of the thermal image (e.g., a histogram). In one example, the temperature range may be measured from a lowest 1% of the temperature characterization to the highest 1% of the temperature characterization in order to omit any outlying temperatures that could skew the determination of the temperature range. In some examples, the temperature range may be determined by internal processing logic of the thermal camera 208 and included in the metadata 220 sent to the computer 204. In other examples, the temperature range may be determined by the computer 204 based on analysis of the thermal image or the corresponding temperature characterization. In other examples, the dynamic quality proxy 222 may be determined based on other metadata associated with the thermal image 218.

When included in the visual assistance device 200, the $N^{th}$ camera 210 is configured to send an $N^{th}$ image 224 and associated metadata 226 to the computer 204. A dynamic quality proxy 228 that serves as an approximation of image quality of the $N^{th}$ image 224 may be determined from the metadata 226. The dynamic quality proxy 228 may take any suitable form.

The computer 204 includes a normalization module 230, a mapping module 232, and a compositing module 234. The normalization module 230 is configured to normalize a bit depth of each of the images received from the plurality of cameras 202. For example, the low-light image 212 may have a 10-bit depth with intensity values ranging from 0-1023 and the thermal image 218 may have an 8-bit depth with temperature values ranging from 0-255. The normalization module 230 may be configured to normalize the bit depth of the low-light image 212 and the bit depth of the thermal image 218 to have the same bit depth. For example, the normalization module 230 may downscale the bit depth of the low-light image to an 8-bit depth to match the bit depth of the thermal image 218. The normalization module 230 may normalize the bit depths of each of the images received from the plurality of cameras 202 to any suitable common bit depth. By normalizing the bit depths of the different types of images to a common bit depth, the process of blending the different types of images to form a composite image may be simplified.

The plurality of cameras 202 may have different real-world positions on the visual assistance device 200. For example, the plurality of cameras 202 may be horizontally spaced apart on a structural frame of the visual assistance device 200 that is worn on a user's head. As another example, the plurality of cameras 202 may be vertically spaced apart on a structural frame of the visual assistance device 200 that is worn on a user's head. The plurality of cameras 200 may be arranged in any suitable manner. Such positional disparity of the different cameras results in the different cameras having slightly different perspectives of a real-world physical scene imaged by the different cameras. The mapping module 232 is configured to reproject pixels of one or more of the images received from the plurality of cameras 202 to reduce or eliminate parallax (e.g., such that all of the images have a same perspective of the imaged scene).

Figure 3:
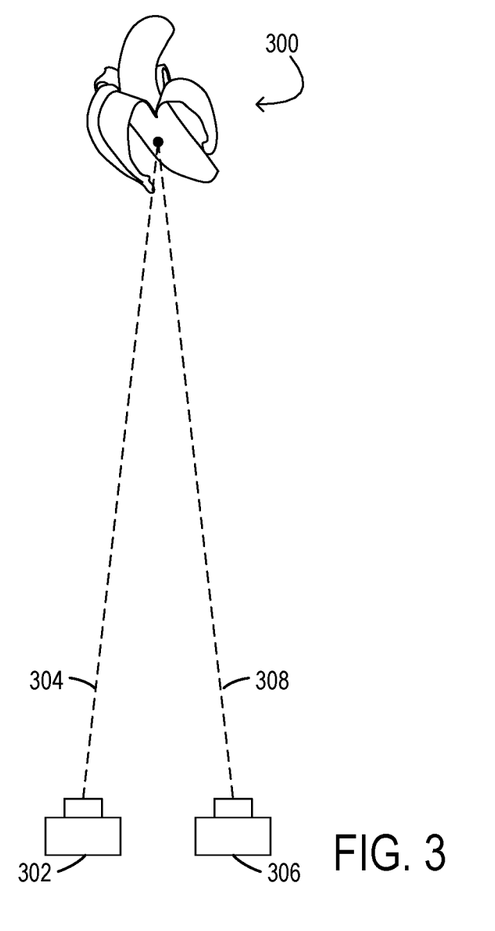
FIGS. 3 and 4 illustrate an example scenario in which pixels of images of positionally disparate cameras are reprojected to reduce parallax between the images.
Figure 4:
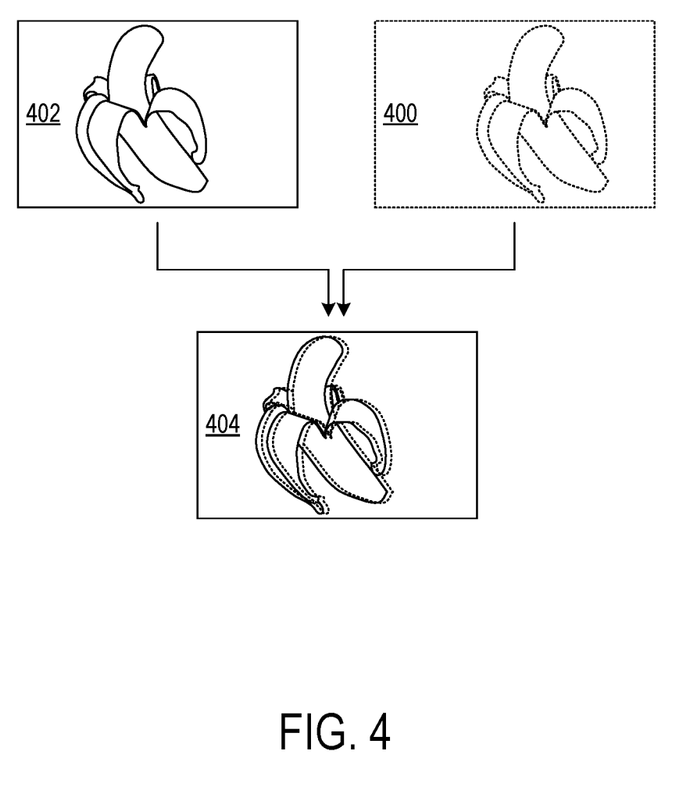

FIGS. 3 and 4 show an example scenario where two cameras employing different sensing modalities capture images of a scene 300 from different perspectives. In FIG. 3, a first camera 302 captures an image of the scene 300 from a first perspective 304. A second camera 306 is positioned rightward relative to a position of the first camera 302. As such, the second camera 306 captures an image of the scene 300 having a second perspective 308 that is different than the first perspective 304 of the first camera 302. In this example scenario the scene 300 includes a banana. In FIG. 4, a first image 400 of the scene 300 captured by the first camera 302 includes the banana shown from the first perspective 304. Further, a second image 402 of the scene 300 captured by the second camera 306 includes the banana shown from the second perspective 308. In this example due to the different perspectives, the position of the banana in the first image 400 is shifted rightward relative to the position of the banana in the second image 402. In this example, the mapping module 232 (shown in FIG. 2) reprojects pixels of the first image 400 to reduce parallax such that both of the first and second images 400 and 402 have a similar adjusted perspective of the scene. Such pixel reprojection allows for pixels of the first and second images 400 and 402 to be blended together to generate a composite image 404 having a cohesive perspective of the scene 300.

The example depicted in FIGS. 3 and 4 and described above is meant to be non-limiting. The mapping module 232 may be configured to reproject pixels of one or more images to reduce parallax in any suitable manner.

Returning to FIG. 2, the compositing module 234 is configured to blend two or more images received from the plurality of cameras 202 in proportion to a dynamic weighting 236 to generate a composite image 240. The compositing module 234 is configured to determine the dynamic weighting 236 based on one or more of the dynamic quality proxies 216, 222, 228 received or determined for one or more of the received images 212, 218, 224. For example, the dynamic weighting 236 may be a function of one or more of the dynamic quality proxies. In one example where the compositing module 234 blends the low-light image 212 and the thermal image 218 to form the composite image 240, an analog gain setting of a low-light sensor of the low-light camera 206 is used to calculate the dynamic weighting 236. In particular, the composited image is formed using a per pixel equation:

$$I'=\alpha*I\_thermal+(1-\alpha)*I\_low\_light$$

where α=scale value*low_light_analog gain. In this equation, I' is the intensity of the composite pixel, I_thermal is the intensity (or temperature) of the pixel in the thermal image, and I_low_light is the intensity of the pixel in the low-light image. According to this equation, the dynamic weighting 236 increases a contribution of the thermal image and decreases a contribution of the low-light image in proportion to an increase of the analog gain and vice versa. In some examples, the α coefficient may be configured to range between 0 and 1 thus allowing the composite image to ignore the contributions of one of the component images at the maximum and minimum α values. In other examples, the α coefficient may be clamped to have a minimum value greater than 0 and/or a maximum value less than 1 (e.g., 0.2-0.8) such that both component images will always provide some contribution the composite image. The above-described example equation is meant to be non-limiting. This equation may be used to generate a monochrome composite image. In examples where the compositing module generates a color composite image, the same equation may be applied to each color channel to generate the composite image.

Any suitable dynamic quality proxy from the low-light camera or another camera may be used to determine the dynamic weighting 236. In other examples, the dynamic weighting 236 may be calculated using additional or alternative dynamic quality proxies from the low-light camera 206. For example, the dynamic weighting may be calculated using the analog gain setting, an exposure setting, and/or an aperture setting of the low-light camera 206 for the low-light image 212.

In yet other examples, the dynamic weighting 236 may be calculated using additional or alternative dynamic quality proxies from different cameras. In one example where the compositing module 234 blends the low-light image 212 and the thermal image 218 to form the composite image 240, the analog gain setting of the low-light sensor of the low-light camera 206 and a temperature range determined for the thermal image 208 may be used in conjunction to calculate the dynamic weighting 236.

In another example, the dynamic weighting 236 may be calculated using one or more dynamic quality proxies for two or more of the plurality of cameras 202. In one example where the compositing module 234 generates the composite image 240 by blending the low-light image 212, the thermal image 218, and the $N^{th}$ image 224, the compositing module 234 may calculate the dynamic weighting 236 based on the first dynamic quality 216, the second dynamic quality proxy 222, and the third dynamic quality proxy 228. Further, the compositing module 234 may blend the low-light image 212, the thermal image 218, and the $N^{th}$ image 224 in proportion to the dynamic weighting 236 to generate the composite image 240.

The compositing module 234 may calculate the dynamic weighting in any suitable manner using any suitable number of dynamic quality proxies. Further, the compositing module 234 may blend any suitable number of different images in proportion to the dynamic weighting 236 to generate the composite image 240.

In some implementations, the compositing module 234 may be configured to temporally average the dynamic weighting 236 for a plurality of composite images successively captured at different times (e.g., video frames). In one example, the compositing module 234 may apply an infinite impulse response (IIR) filter to the dynamic weighting 236. Temporally averaging the dynamic weighting 236 for a plurality of composite images may provide a smoothing effect across the plurality of composite images. As such, the dynamic weighting does not change drastically from one image to the next, which could be disorienting to the user.

In some implementations, the compositing module 234 may be configured to estimate an "image quality" of the composite image 240 based on the dynamic quality proxies used to calculate the dynamic weighting 236 for the composite image 240. Further, the compositing module 234 may be configured to opt not to display the composite image 240 or further modify the composite image 240 based on determining that the estimated "image quality" of the composite image 240 is below a threshold quality. In one example, the analog gain setting of the low-light sensor of the low-light camera 206 and the temperature range of the thermal camera 208 serve as dynamic quality proxies used to calculate the dynamic weighting. In this example, the compositing module 234 may determine that the estimated "image quality" of the composite image 240 is below a threshold quality based on the analog gain setting of the low-light sensor of the low-light camera 206 being greater than a threshold gain value and the temperature range of the thermal camera 208 being than less than a threshold temperature range value. Accordingly, the compositing module 234 may opt not to present the composite image 240 on the near-eye display 242 since the "low quality" of the composite image limits the degree to which the composite image visually enhances the scene. Alternatively, the compositing module 234 may optionally apply a dimming filter 238 to the composite image 240. The dimming filter 238 may be configured to reduce an overall brightness of the composite image 240 such that the noisy composite image is less perceptible by the user on the near-eye display 242. In yet other examples, the computer 204 may be configured to present a notification to the user indicating that the composite image is noisy, and the user can manually select whether or not to present the composite image on the near-eye display 242.

In some implementations, the compositing module 234 may be further configured to composite virtual imagery with the camera imagery to provide an augmented reality or mixed reality experience. As one example, the compositing module 234 may be configured to overlay a virtual heads-up display (HUD) on the composite image 240. The compositing module 234 may enhance the composite image 240 with virtual imagery in any suitable manner.

Figure 5A:
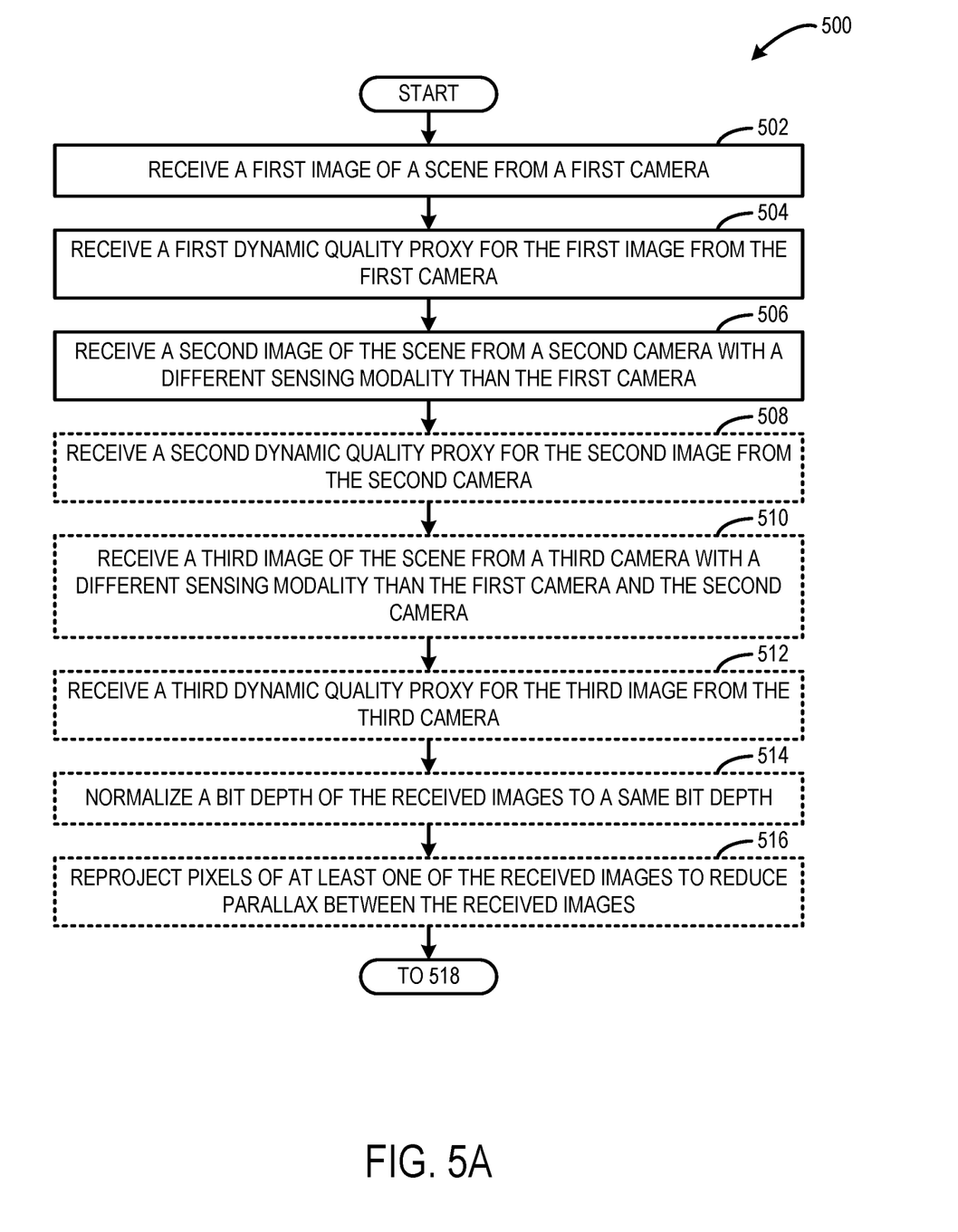
FIGS. 5A and 5B show an example method for blending images based on a dynamic quality proxy.
Figure 5B:
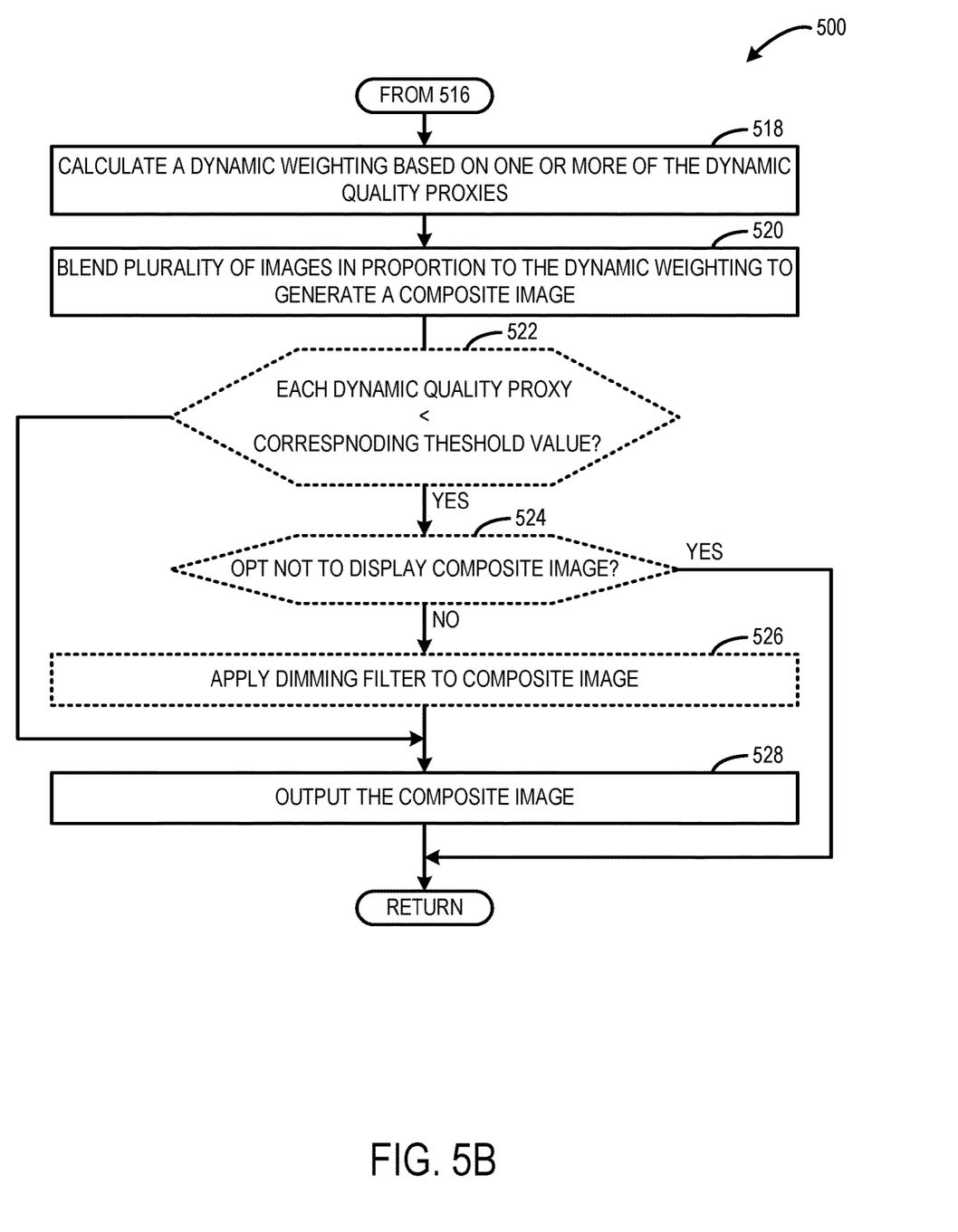

FIGS. 5A and 5B show an example method 500 for blending images based on a dynamic quality proxy. For example, the method 500 may be performed by the visual assistance device 100 shown in FIG. 1, the visual assistance device 200 shown in FIG. 2, or generally by any other suitable computing system, such as computing system 600 of FIG. 6. In FIG. 5A, at 502, the method 500 includes receiving a first image of a scene from a first camera. At 504, the method 500 includes receiving a dynamic quality proxy for the first image from the first camera. At 506, the method 500 includes receiving a second image of the scene from a second camera with a different sensing modality than the first camera. In one example, the first camera is a low-light camera, the second camera is a thermal camera, and the first dynamic quality proxy is an analog gain of the low-light sensor of the low-light camera.

In some implementations, at 508, the method 500 optionally may include receiving a second dynamic quality proxy for the second image from the second camera. In one example where the second camera is a thermal camera, the second dynamic quality proxy may include a temperature range of a thermal image.

In some implementations, at 510, the method 500 optionally may include receiving a third image from a third camera with a different sensing modality than the first camera and the second camera. In some implementations, at 512, the method 500 optionally may include receiving a third dynamic quality proxy for the third image from the third camera. While FIG. 5A shows three images received serially, it is to be understood that multiple frames of video may be continually received, in serial and/or parallel, from any number of plural cameras.

In some implementations, at 514 the method 500 optionally may include normalizing a bit depth of the received images to a same bit depth.

In some implementations, at 516 the method 500 optionally may include reprojecting pixels of at least one of the received images to reduce or eliminate parallax.

In FIG. 5B, at 518, the method 500 includes calculating a dynamic weighting based on one or more of the dynamic quality proxies. In one example, the dynamic weighting may be calculated based on one or more dynamic quality proxies of one camera. For example, the dynamic weighting may be calculated based on an analog gain of a low-light sensor of a low-light camera. In other examples, the dynamic weighting may be calculated based on one or more dynamic quality proxies of two or more of the cameras. At 520, the method 500 includes blending the plurality of images in proportion to the dynamic weighting to generate a composite image. In some examples, the first and second images may be blended in proportion to the dynamic weighting to generate a composite image. In implementations where the third image is received, the first, second, and third images may be blended in proportion to the dynamic weighting to generate a composite image.

In some implementations, at 522, the method 500 optionally may include determining that each dynamic quality proxy used to determine the dynamic weighting is less than a corresponding threshold value that estimates image quality. In other words, all the images being blended are estimated to be of "low quality." If it is determined that any of the estimated images are of suitable quality (i.e., any one of the dynamic quality proxies is greater than the corresponding threshold value), then the method 500 moves to 528. Otherwise, the method 500 moves to 524. At 524, the method 500 optionally may include determining to opt not to display the composite image. If it is determined to opt not to display the composite image, then the method 500 returns without outputting the composite image. Otherwise, the method 500 moves to 526. At 526, the method 500 optionally may include applying a dimming filter to the composite image to reduce an overall brightness of the composite image. In this scenario, the composite image is noisy or "lower quality" and dimming the composite image may make such noise less perceptible to the user. While method 500 shows the quality assessment occurring after blending and before outputting the composite image, such quality assessment may instead be used to determine whether blending is to occur.

At 528, the method 500 includes output the composite image. In some examples, outputting the composite image may include visually presenting the composite image on a near-eye display of the visual assistance device (e.g., an opaque virtual reality display or an at least partially-transparent augmented/mixed reality display). In other examples, outputting the composite image may include storing the composite image in a storage device of the visual assistance device. In yet other examples, outputting the composite image may include sending the composite image to another module for additional image processing. In still yet other examples, outputting the composite image may include sending the composite image to a remote computing device (e.g., a remote display, a cloud computing device).

The above-described method may be performed to blend a plurality of images automatically and dynamically in proportion to a dynamic weighting that is calculated based on one or more dynamic quality proxies that serve as an approximation of image quality. By dynamically adjusting the weighting used to blend the images based on the approximation of image quality, a contribution of a "higher quality" image may be greater than a contribution of a "lower quality" image, such that the resulting composite image may have an overall higher signal-to-noise ratio or "higher quality". Moreover, in implementations where the dynamic quality proxy includes a camera parameter or setting that is already available, the images themselves do not have to be analyzed to assess weighting. Instead, an easy calculation can be performed based on the already-available parameters, thus decreasing the computational expense of dynamically blending the images.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
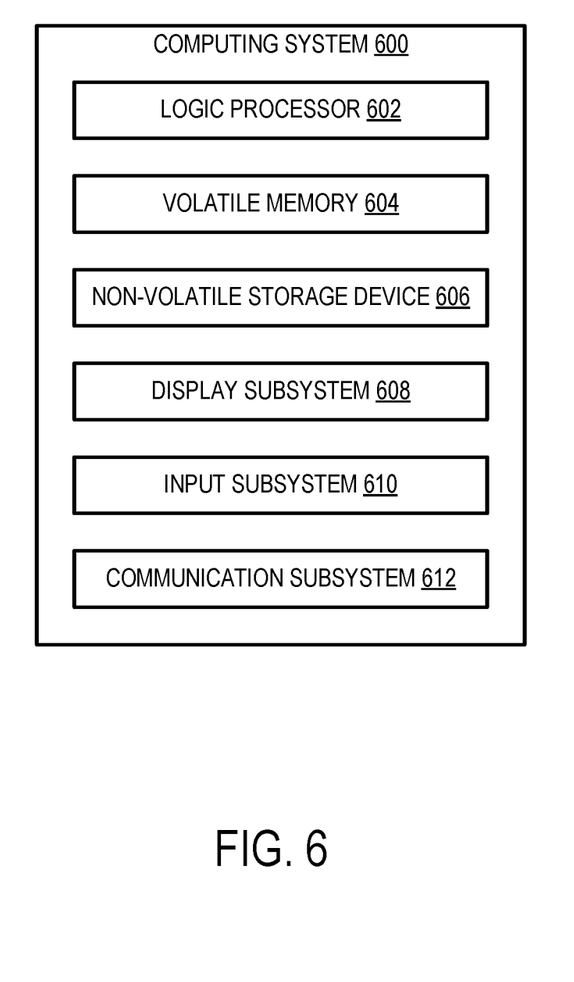
FIG. 6 shows an example computing system.

FIG. 6 schematically shows a non-limiting implementation of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices, and cameras, wearable computing devices such as smart wristwatches and head mounted augmented reality devices. For example, the computing system 600 may correspond to the visual assistance device 100 shown in FIG. 1 and the visual assistance device 200 shown in FIG. 2.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor 602 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 602 may include one or more physical processors (hardware) configured to execute software instructions. Additionally or alternatively, the logic processor 602 may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor 602 optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines, it will be understood.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The logic processor 602, volatile memory 604, and non-volatile storage device 606 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 600 typically implemented in software by a processor to perform a particular function using portions of volatile memory, which function involves transformative processing that specially configures the processor to perform the function. Thus, a module may be instantiated via logic processor 602 executing instructions held by non-volatile storage device 606, using portions of volatile memory 604. It will be understood that different modules may be instantiated from the same application, service, code block, object, library, routine, API, function, etc. Likewise, the same module may be instantiated by different applications, services, code blocks, objects, routines, APIs, functions, etc. The terms "module" may encompass individual or groups of executable files, data files, libraries, drivers, scripts, database records, etc.

When included, display subsystem 608 may be used to present a visual representation of data held by non-volatile storage device 606. This visual representation may take the form of a graphical user interface (GUI). Display subsystem 608 may include one or more display devices utilizing virtually any type of technology. In some implementations, display subsystem 608 may include one or more virtual-, augmented-, or mixed reality displays.

When included, input subsystem 610 may comprise or interface with one or more input devices. An input device may include a sensor device or a user input device. Examples of user input devices include a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 612 may be configured to communicatively couple computing system 600 with one or more other computing devices. Communication subsystem 612 may include wired and/or wireless communication devices compatible with one or more different communication protocols. The communication subsystem may be configured for communication via personal-, local- and/or wide-area networks.

In an example, a computing system comprises a logic machine, and a storage machine holding instructions executable by the logic machine to receive a first image of a scene from a first camera at an analog gain setting of an image sensor of the first camera, receive a second image of the scene from a second camera with a different sensing modality than the first camera, and output a composite image blended from the first and second images in proportion to a dynamic weighting based on the analog gain setting of the image sensor of the first camera. In this example and/or other examples, the dynamic weighting may increase a contribution of the second image and may decrease a contribution of the first image in proportion to an increase of the analog gain setting of the image sensor of the first camera. In this example and/or other examples, the first camera may be a low-light camera. In this example and/or other examples, the second camera may be a thermal camera.

In another example, a visual assistance device, comprises a low-light camera configured to capture low-light images, a thermal camera configured to capture thermal images, a near-eye display, and a computer configured to receive a low-light image of a scene from the low-light camera at an analog gain setting of a low-light sensor of the low-light camera, receive a thermal image of the scene from the thermal camera, and output, via the near-eye display, a composite image blended from the low-light and thermal images in proportion to a dynamic weighting based on the analog gain setting of the low-light sensor of the low-light camera. In this example and/or other examples, the dynamic weighting may increase a contribution of the thermal image and may decrease a contribution of the low-light image in proportion to an increase of the analog gain setting of the low-light sensor of the low-light camera. In this example and/or other examples, the computer may be further configured to normalize a bit depth of the first image and a bit depth of the second image to a same bit depth. In this example and/or other examples, the computer may be further configured to reproject pixels of at least one of the first image and the second image to reduce parallax between the first image and the second image.

In yet another example, a computer-implemented method comprises receiving a first image of a scene from a first camera, receiving a dynamic quality proxy, receiving a second image of the scene from a second camera with a different sensing modality than the first camera, calculating a dynamic weighting based on the dynamic quality proxy, blending the first image and the second image in proportion to the dynamic weighting to generate a composite image, and outputting the composite image. In this example and/or other examples, the dynamic quality proxy may include an analog gain setting of an image sensor of the first camera for the first image. In this example and/or other examples, the dynamic quality proxy may include an aperture setting of the first camera for the first image. In this example and/or other examples, the dynamic quality proxy may include an exposure setting of the first camera for the first image. In this example and/or other examples, the dynamic weighting may change a contribution of the second image and may reciprocally change a contribution of the first image in proportion to a change of the dynamic quality proxy. In this example and/or other examples, the dynamic quality proxy may be a first dynamic quality proxy of the first camera for the first image, and the method may further comprise receiving a second dynamic quality proxy of the second camera for the second image, the dynamic weighting may be calculated further based on the second dynamic quality proxy. In this example and/or other examples, the dynamic weighting may be configured such that when the first dynamic quality proxy is less than a first threshold value and the second dynamic quality proxy is less than a second threshold value, a dimming filter is applied to the composite image. In this example and/or other examples, the first camera may be a low-light camera, the first image may be a low-light image, the second camera may be a thermal camera, the second image may be a thermal image, and the method may further comprise receiving a temperature characterization of the thermal image and determining a temperature range of the thermal image based on the temperature characterization, wherein the second dynamic quality proxy includes the temperature range. In this example and/or other examples, the method may further comprise receiving a third image of the scene from a third camera with a different sensing modality than the first camera and the second camera, and receiving a third dynamic quality proxy of the third camera for the third image, the dynamic weighting may be calculated further based on the third dynamic quality proxy, and the first image, the second image, and the third image may be blended in proportion to the dynamic weighting to generate the composite image. In this example and/or other examples, the dynamic weighting may be temporally averaged for a plurality of composite images successively captured at different times. In this example and/or other examples, the method may further comprise normalizing a bit depth of the first image and a bit depth of the second image to a same bit depth. In this example and/or other examples, the method may further comprise reprojecting pixels of at least one of the first image and the second image to reduce parallax between the first image and the second image.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a logic machine; and
a storage machine holding instructions executable by the logic machine to:
receive a first image of a scene from a first camera at an analog gain setting of an image sensor of the first camera;
receive a second image of the scene from a second camera with a different sensing modality than the first camera; and
output a composite image blended from the first and second images in proportion to a dynamic weighting that changes a contribution of the second image and inversely changes a contribution of the first image based on a change of the analog gain setting of the image sensor of the first camera.

2. The computing system of claim 1, wherein the dynamic weighting increases the contribution of the second image and decreases the contribution of the first image in proportion to an increase of the analog gain setting of the image sensor of the first camera.

3. The computing system of claim 1, wherein the first camera is a low-light camera.

4. The computing system of claim 1, wherein the second camera is a thermal camera.

5. A visual assistance device, comprising:
a low-light camera configured to capture low-light images;
a thermal camera configured to capture thermal images;
a near-eye display; and
a computer configured to:
receive a low-light image of a scene from the low-light camera at an analog gain setting of a low-light sensor of the low-light camera;
receive a thermal image of the scene from the thermal camera; and
output, via the near-eye display, a composite image blended from the low-light and thermal images in proportion to a dynamic weighting that changes a contribution of the thermal image and inversely changes a contribution of the low-light image based on a change of the analog gain setting of the low-light sensor of the low-light camera.

6. The visual assistance device of claim 5, wherein the dynamic weighting increases the contribution of the thermal image and decreases the contribution of the low-light image in proportion to an increase of the analog gain setting of the low-light sensor of the low-light camera.

7. The visual assistance device of claim 5, wherein the computer is further configured to:
normalize a bit depth of the low-light image and a bit depth of the thermal image to a same bit depth.

8. The visual assistance device of claim 5, wherein the computer is further configured to:
reproject pixels of at least one of the low-light image and the thermal image to reduce parallax between the low-light image and the thermal image.

9. A computer-implemented method comprising:
receiving a first image of a scene from a first camera;
receiving a dynamic quality proxy;
receiving a second image of the scene from a second camera with a different sensing modality than the first camera;
calculating a dynamic weighting based on the dynamic quality proxy;
blending the first image and the second image in proportion to the dynamic weighting to generate a composite image, wherein the dynamic weighting changes a contribution of the second image and inversely changes a contribution of the first image to the composite image based on a change of the dynamic quality proxy; and
outputting the composite image.

10. The method of claim 9, wherein the dynamic quality proxy includes an analog gain setting of an image sensor of the first camera for the first image.

11. The method of claim 9, wherein the dynamic quality proxy includes an aperture setting of the first camera for the first image.

12. The method of claim 9, wherein the dynamic quality proxy includes an exposure setting of the first camera for the first image.

13. The method of claim 9, wherein the dynamic weighting increases the contribution of the second image and decreases the contribution of the first image in proportion to an increase of the dynamic quality proxy.

14. The method of claim 9, wherein the dynamic quality proxy is a first dynamic quality proxy of the first camera for the first image, and wherein the method further comprises receiving a second dynamic quality proxy of the second camera for the second image, wherein the dynamic weighting is calculated further based on the second dynamic quality proxy.

15. The method of claim 14, wherein the dynamic weighting is configured such that when the first dynamic quality proxy is less than a first threshold value and the second dynamic quality proxy is less than a second threshold value, a dimming filter is applied to the composite image.

16. The method of claim 14, wherein the first camera is a low-light camera, the first image is a low-light image, the second camera is a thermal camera, the second image is a thermal image, and wherein the method further comprises:
   receiving a temperature characterization of the thermal image; and
   determining a temperature range of the thermal image based on the temperature characterization, wherein the second dynamic quality proxy includes the temperature range.

17. The method of claim 14, further comprising:
   receiving a third image of the scene from a third camera with a different sensing modality than the first camera and the second camera; and
   receiving a third dynamic quality proxy of the third camera for the third image, wherein the dynamic weighting is calculated further based on the third dynamic quality proxy, and wherein the first image, the second image, and the third image are blended in proportion to the dynamic weighting to generate the composite image.

18. The method of claim 9, wherein the dynamic weighting is temporally averaged for a plurality of composite images successively captured at different times.

19. The method of claim 9, further comprising:
   normalizing a bit depth of the first image and a bit depth of the second image to a same bit depth.

20. The method of claim 9, further comprising:
   reprojecting pixels of at least one of the first image and the second image to reduce parallax between the first image and the second image.

* * * * *